Patented Dec. 11, 1951

2,578,595

UNITED STATES PATENT OFFICE 2,578,595

RODENT REPELLING BINDER CORD AND PROCESS OF MAKING SAME

Anderson W. Ralston, John P. Barrett, and Ervin W. Segebrecht, Chicago, Ill., assignors to Armour and Company, Chicago, Ill., a corporation of Illinois No Drawing. Application June 16, 1947, Serial No. 755,020

8 Claims. (Cl. 117—138.5)

This invention relates to rodent repelling binder cord and the like.

The damage to cord, and more particularly to bindery twine, by rodents has presented for many years an acute problem in the industry. The cutting of bindery twine, after the grain has been tied in bundles, by field mice or rats results in a loss of grain and greatly increases the labor required in handling the broken bundles.

A large number of chemicals considered as possible rodent repellents have been tried, including pyrethrum, oil citronella, various essential oils, mercaptans, pine oil, and more recent chemical combinations sold under trade names, but these have been found ineffective either because they are not retained by the twine for a substantial period or because they are ineffective as against rodents. None of such chemicals, when tested in laboratories, have restrained rats for more than 48 to 96 hours, and by reason of their relatively short period of effectiveness, they do not offer a solution to the problem.

An object of the present invention is to provide a cord or binder twine which is treated to have the property of restraining rodents from attack upon the twine for long periods of time. Yet another object is to provide a method and a treated cord product offering a solution for the above problem, while at the same time providing a cord product which is improved as a binder element through the use of the treating material. Other specific objects and advantages will appear as the specification proceeds.

We have discovered that when binder twine is treated so as to incorporate therein an aliphatic nitrile having from 8 to 18 carbon atoms in the hydrocarbon radical, that the cord is effective for a period of weeks in restraining wild rats or mice from attacking the cord. The cord may be impregnated or treated in any suitable way, such as by spraying the nitrile upon the cord, dipping the cord into a nitrile bath, or by any other desired method.

As specific examples which give highly successful results, lauronitrile and myristonitrile may be mentioned. Binder twine treated with either of these nitriles is found to keep rodents away from the twine for periods of a month or so.

The nitriles which may be employed successfully are aliphatic nitriles and may have from 8 to 18 carbon atoms in the hydrocarbon radical. Low molecular weight nitriles are found to be unsatisfactory. The nitriles may be saturated or unsaturated.

In the testing of repellents on bindery twine, an iron screen cage is employed for confining the wild rats, etc. One side of the cage has three openings. In the test, the openings are closed by a curtain or screen woven from the bindery twine. In one form of the test, all three openings are closed with twine impregnated with the same chemical which is being tested. In another test, each of the three openings are closed by twine nets impregnated with different chemicals. In the first test, the rats have no choice, and in the second test there is a multiple choice. Food and water are placed in the cages. The object of the test is to determine the length of time lapsing before the rats chew through the impregnated twine to escape into an outer cage.

Twine impregnated with the nitriles of the type described restrains rats from chewing through the barrier for about five days or more. Twine impregnated with myristonitrile restrained rats from chewing through the barrier for 20 days. Lauronitrile-treated twine restrained the rats for 30 days and more. These results are with respect to the first test where the rats had no choice between nets treated with different chemicals. Under the second test where a choice was provided, the rats avoided the nitrile-treated nets and made their way out through nets treated with different chemicals. In the multiple choice test, where one of the openings was closed with either lauronitrile or myristonitrile, the other openings being closed with twine impregnated with other types of chemicals, none of the rats escaped through either the myristonitrile or lauronitrile impregnated twine nets.

The nitrile-treating material described herein is useful in the treatment of bindery twine or cord for preserving it and improving it as a cord structure, while at the same time rendering the cord substantially repellent over long periods of time to rodents. The treating process is extremely simple and may be varied widely to bring about the impregnation or application of the nitrile to the cord or twine.

While in the foregoing specification, we have set out specific examples in considerable detail for the purpose of illustrating one mode of practicing the invention, it will be understood that such details may be varied widely by those skilled in the art without departing from the spirit of our invention.

We claim:

1. A cord impregnated with an aliphatic nitrile selected from the group consisting of nitriles having from 8 to 18 carbon atoms in the hydrocarbon radical.

2. A binder cord impregnated with a liquid selected from the group consisting of aliphatic nitriles having from 8 to 18 carbon atoms in the hydrocarbon radical.

3. A binder cord having incorporated therewith an aliphatic nitrile selected from the group consisting of nitriles having from 12 to 14 carbon atoms in the hydrocarbon radical.

4. Binder twine impregnated with lauronitrile.

5. Binder twine impregnated with myristonitrile.

6. A process for rendering binder cord highly repellent to rodents, comprising incorporating in said cord an aliphatic nitrile having from 8 to 18 carbon atoms in the hydrocarbon radical.

7. A process for rendering binder twine highly repellent to rodents, comprising impregnating said twine with myristonitrile.

8. A process for rendering binder twine highly repellent to rodents, comprising impregnating said twine with lauronitrile.

ANDERSON W. RALSTON.
JOHN P. BARRETT.
ERVIN W. SEGEBRECHT.

REFERENCES CITED

The following references are of record in the file of this patent:

UNITED STATES PATENTS

| Number | Name | Date |
|---|---|---|
| 255,040 | Skinner | Mar. 14, 1882 |
| 2,033,536 | Ralston et al. | Mar. 10, 1936 |
| 2,201,170 | Hanford | May 21, 1940 |
| 2,201,200 | Pinckney | May 21, 1940 |
| 2,356,075 | Migrdichian | Aug. 15, 1944 |

OTHER REFERENCES

Lindquist et al., Journal of Economic Entomology, vol. 37, No. 4, August 1944, pages 485–486.